Aug. 16, 1949.  D. G. PERRY  2,479,133
HYDRAULIC BRAKE
Filed Aug. 27, 1946
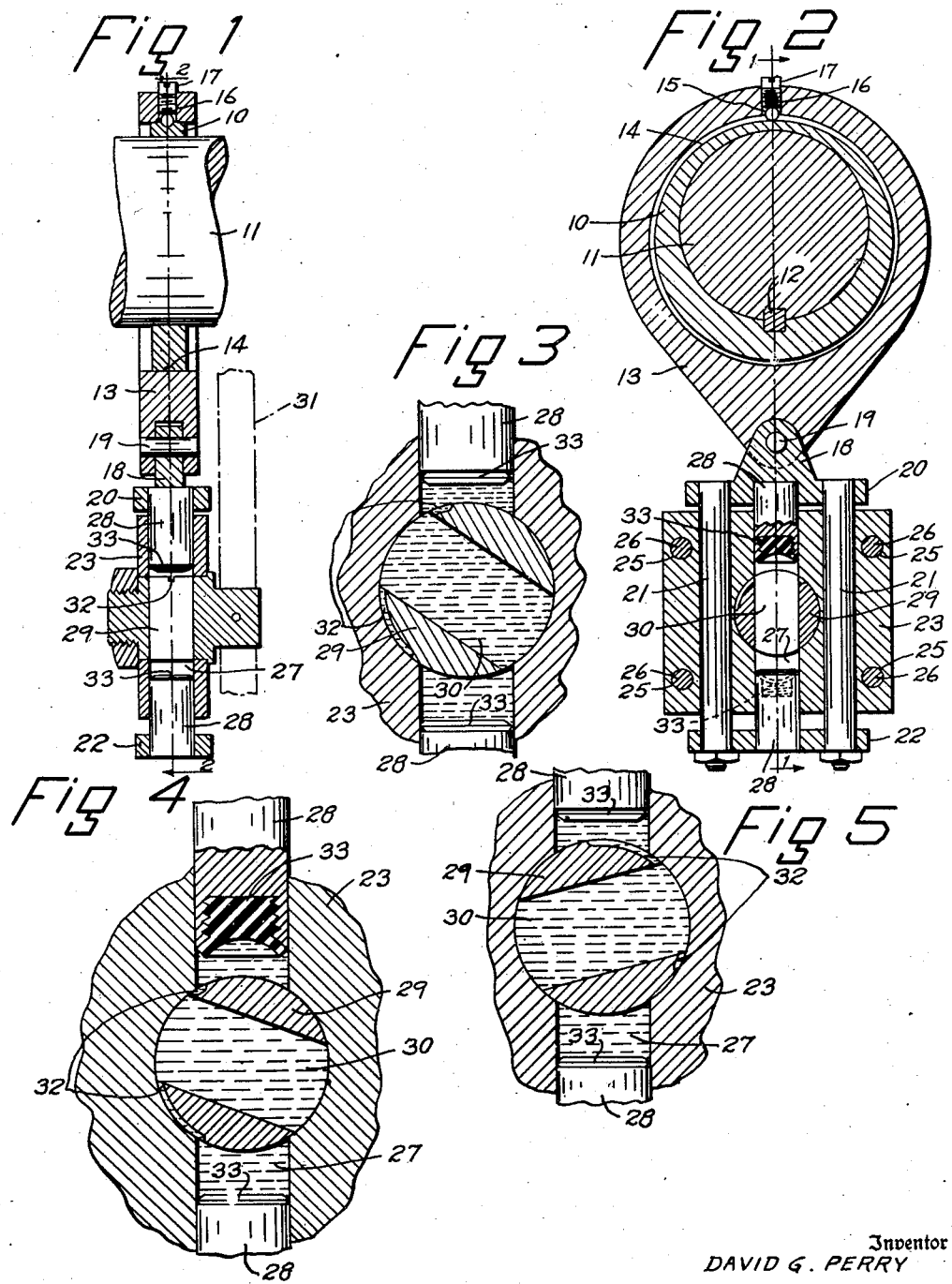
Inventor
DAVID G. PERRY
By Henry Silberis
his Attorney Patented Aug. 16, 1949

2,479,133

UNITED STATES PATENT OFFICE 2,479,133

HYDRAULIC BRAKE

David G. Perry, Dayton, Ohio

Application August 27, 1946, Serial No. 693,197

5 Claims. (Cl. 188—99)

This invention relates to hydraulic brakes and particularly to the type for arresting rotary movement of a shaft or axle.

An object of the invention is to provide a brake device which is automatic in its operation and requires a minimum effort on the part of the operator.

Another object of the invention is to provide a brake device which requires no brake bands.

Another object of the invention is to provide a brake device which utilizes fluid under compression to effect the braking action.

Another object of the invention is to provide a brake device in which all elements of the brake mechanism move with the axle as it is rotating and the use of fluid under compression to arrest movement of the elements to effect the braking action.

A specific object of the invention is the provision of a brake mechanism simple in construction requiring a minimum number of parts and space in its installation.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 1 is a cross sectional view of the brake mechanism, taken on line 1—1 of Fig. 2.

Fig. 2 is a cross sectional view of the brake mechanism, taken on line 2—2 of Fig. 1.

Fig. 3 is a detail enlarged view of the valve mechanism, showing the position of the valve just before it reaches its closed position.

Fig. 4 is a detail enlarged view showing the valve in one of its closed positions and illustrates the by-pass groove in its effective position.

Fig. 5 is a detail enlarged view showing the valve in its completely closed position.

General description

The brake mechanism constituting the present invention is applicable to any machine having a rotating shaft or axle which it is desired to arrest, such as the wheels of an automobile, the rotating shaft of a hoist, etc. In the present description, the invention will be described as adapted for use in stopping an automobile. It is to be understood, however, that it is not intended to limit the use of the invention to this application, since it is useful in many other applications, as will be readily understood from the description which follows.

When the invention is applied to an automobile, an eccentric is mounted on each of the wheel axles so as to rotate therewith. A housing having a circular runway fitting over each eccentric is provided, to which is mounted, so as to be moved thereby, a frame carrying two pistons facing toward each other. A cylinder block is mounted on the framework of the car, in which the pistons are assembled. When the automobile is moving and the axles are rotating, the eccentrics reciprocate the frame and the pistons. The cylinder is loaded with a fluid, and, as the pistons move back and forth, the fluid moves back and forth in the cylinder. A valve is provided in the cylinder between the ends of the pistons, which has an opening normally registering with the cylinder walls. As the valve is rotated, by any convenient means, the opening in the valve is moved out of register with the cylinder walls. This movement can be gradual to progressively restrict the flow of fluid and gradually build up pressure in the cylinder by the moving pistons. When the valve is completely closed, the flow of fluid in the cylinder is arrested, thus stopping movement of the pistons. The pressure built up in the cylinder is very great, and, to prevent the fluid from seeping past the pistons, a resilient cap is provided on the piston ends, which, when the fluid is under pressure, is forced against the side walls of the cylinder to seal the fluid in the cylinder against seeping. Stopping reciprocating movement of the pistons and of the frame on which they are mounted also stops reciprocation of the housing on the eccentric, thus preventing further rotation of the eccentric and the wheel axles on which it is secured. In order to prevent too sudden stopping of the axles, each valve is provided with a bleeding groove to provide for bleeding fluid to cushion the stopping action of the axle. The valve is movable in two directions out of normal or opening position into closed positions. One of the closed positions brings the bleeding groove into play. No bleeding groove is provided in the second closed position, thus positively stopping rotation of the axle.

When the invention is used on an automobile, the first closed position is used for stopping the moving automobile by the usual foot pedal, and the second closed position is used for braking the automobile for emergency stopping or parking.

Detailed description

A cam, illustrated herein in the form of an eccentric 10 is mounted for rotation with a shaft or axle 11 and can be secured thereon by any well-known means such as a key 12. Fitted over the eccentric 10 is a housing member 13, provided with an inner opening to form a running fit on the eccentric. A ball runway 14 in the periphery of the eccentric, in the form of an annular groove into which balls 15 fit, is provided to form a means for maintaining the housing and the eccentric in proper lateral alinement and to further provide a simple and efficient means to assemble the brake unit to the shaft or axle. Any convenient number of balls 15 can be used, depending on the requirements of the particular installation. In the illustration herein, only one such ball 15 is shown. The housing member 13 is assembled to the eccentric by first positioning it on the eccentric, then dropping a ball 15 into opening 16 in the housing, and thereafter inserting screw plugs 17. The screw plugs 17 also provide a means for adjusting the balls 15 when the unit is originally assembled, and for taking up any wear on the eccentric or housing due to long use.

The housing member 13 is pivotally connected to an ear 18 of a reciprocable frame by a suitable means such as a stud 19. The ear 18 is formed on one frame member 20, to which are securely fastened two pilots 21. Mounted on the free ends of the pilots 21 is a second frame member 22, which, for convenience of assembling and disassembling the brake unit, is detachably connected to the pilots 21. This construction results in a solid framework consisting of the two frame members 20 and 22 and the two pilots 21.

The pilots 21 are slidable in a cylinder block 23 secured to the framework of the machine to which the brake unit is to be attached. Any convenient means for attaching the cylinder block 23 to the frame of the machine can be used. The block is illustrated as having four bolt holes 25, into which bolts 26 can be inserted in the usual manner.

An opening forming a cylinder 27 is bored through the cylinder block 23 from one end to the other. A piston 28 is inserted into each end of the cylinder, and each piston is securely fastened to a frame member 20 and 22, respectively. The pistons are assembled on their respective frame plate in such a manner as to project into the cylinder 27 from opposite sides thereof and toward each other.

Midway between the ends of the cylinder block 23, and at right angles to the cylinder 27, an opening is bored to receive a valve 29. When the valve 29 is assembled in the cylinder block 23 and is standing in its open position, an opening 30 therein registers with the cylinder 27. The opening 30 is of the same diameter as the cylinder 27, thus forming a continuous opening from one piston end to the other, as clearly shown in Fig. 2.

Any convenient means, such as lever 31, can be provided for rotating the valve 29 in either direction from the open position. Rotation of the valve 29 into either closed position moves the opening therein out of registering position with the cylinder 27 to close the passage between the ends of the pistons 28.

The space in the cylinder not occupied by the pistons 28 and the space provided by the openings 30 in the valve 29 are filled with oil or any other suitable fluid.

The valve 29 may be provided with a small groove 32 on one side thereof, which extends around the valve far enough to provide a by-pass for the fluid in the cylinder around the valve 29 for cushioning the braking action of the axle or shaft 11 when desired. The dimensions of the groove 32 are determined by the necessities of the particular machine to which the brake is applied, and must be determined by tests. When the brake is used on an automobile, the by-pass groove 32 is brought into effective position by the brake pedal or whatever instrumentality is selected for operating the brake. When the emergency brake is used, the by-pass groove is not effective, and a positive locking action is obtained in the manner explained hereinafter.

In order to prevent fluid from leaking past the pistons 28 when the flow of fluid is arrested, a plug 33 of resilient material, such as neoprene, is inserted into the free ends of the piston. The plugs 33 are cup-shaped on their faces, and the outer rims of the plugs extend above the faces of the pistons so as to normally ride on the cylinder walls. When the flow of fluid is arrested by closing valve 29, pressure is built up against the cup-shaped faces of the plugs, causing the outer rims to be forced against the cylinder walls. The higher the pressure built up in the cylinder, the tighter the seal will be.

The plug 33 can be inserted into the end of the piston in any desired manner. One method is to mold the shank of the plug with screw threads for screwing the plug into a threaded hole in the piston, as illustrated in the drawings.

Operation

The mode of operation of the invention is described as applied to an automobile. The action of the brake on one wheel only is described, since all units act alike.

When the automobile is moving, the axle 11 is rotating, thereby rotating eccentric 10, which in turn reciprocates the housing 13 and the piston frame, as guided by pilots 21 in the cylinder block. Reciprocating the frame moves the pistons back and forth, thus flowing the fluid in the cylinder 27 back and forth between the piston ends. This movement continues as long as the axle is rotating. When it is desired to stop the automobile—for example, by use of the conventional foot pedal—lever 31 is rocked to move the valve 29 into the closed position, shown in Fig. 4. This moves the opening in the valve out of registering position with the cylinder 27 and stops flow of the fluid in the cylinder, therefore arresting reciprocating movement of the pistons, the frame, and the housing member 13. Since the member 13 cannot longer reciprocate, the eccentric 10 is held against rotation, thus bringing the axle 11 to a stop. In order to prevent too sudden stopping of the axle, causing damage to the car or to the tires, the by-pass groove 32 is provided to permit flow of the fluid around the valve at a very slow rate. The groove 32 is small enough to allow for a cushioned stop. The size of the groove depends on the automobile upon which the unit is assembled and must be determined by test.

When the emergency brake is applied, the lever is rocked in a direction opposite to that moved by the foot pedal, which brings valve 29 to the position illustrated in Fig. 5, wherein no by-pass is provided, and therefore the flow of fluid is positively stopped.

The cup of neoprene or other similar material on the pistons prevents leakage of fluid past the pistons.

The action of the valve when turned in either direction is such that an automobile can be brought to rest gradually by slow rotation of the valve, if desired. As the valve rotates, it progressively closes the area of the opening between the cylinder and the valve opening. As the opening becomes smaller, more resistance is placed on the pistons. Fig. 3 illustrates the position of the valve just before it moves into fully closed positions. It will be noted that the openings between the cylinder and the valve are very small, permitting a smaller flow of fluid under pressure and thus causing the fluid to resist the rotating movement of the eccentric and the axle to slow them down.

The features of the invention reside in its simplicity of construction, its small size, and a minimum number of moving parts. The size makes its feasible to radically redesign the conventional wheels of an automobile, making large hubs unnecessary, thus giving a wider latitude in wheel design. A further feature lies in the fact that the fluid acts as the braking medium, thus eliminating the necessity of brake bands and the necessity of frequent replacements and/or adjustments.

While the form of mechanism shown and described herein is admirably adapted to fulfill the objects primarily stated, it is to be understood that it is not intended to confine the invention to the one form or embodiment disclosed herein, for it is susceptible of embodiment in various forms all coming within the scope of the claims which follow.

What is claimed is:

1. In a brake device, the combination of a reciprocating frame including two end members; two pistons, one mounted on each end member, extending inwardly toward each other; a single cylinder between the end members, into which the two pistons extend; a valve in the cylinder located between the free ends of the two pistons; a port in the valve having an open position and a closed position, said port registering with the inner walls of the cylinder when the valve is in open position and said port in non-registering position with the inner walls of the cylinder when the valve is in closed position; fluid completely filling the cylinder and said port; a rotatable shaft; a cam on the rotatable shaft; means in the frame coacting with said cam whereby the cam reciprocates the frame and the pistons when the shaft is rotated and the port in the valve registers with the inner walls of the cylinder to permit free flow of the fluid in the cylinder; and means to close said valve by moving said port into its non-registering position to arrest the flow of fluid in the cylinder to thereby cause the fluid to arrest the reciprocating movement of the frame and the rotation of the cam.

2. In a brake device, the combination of a reciprocating frame including two end members; two pistons, one mounted on each end member, extending inwardly toward each other; a single cylinder between the end members, into which the two pistons extend; a valve in the cylinder located between the free ends of the two pistons; a port in the valve having an open position and a closed position, said port registering with the inner walls of the cylinder when the valve is in open position and said port in non-registering position with the inner walls of the cylinder when the valve is in closed position; a by-pass groove in the periphery of said valve; fluid completely filling the cylinder and said port; a rotatable shaft; a cam on the rotatable shaft; means in the frame coacting with said cam whereby the cam reciprocates the frame and the pistons when the shaft is rotated and the port in the valve registers with the inner walls of the cylinder to permit free flow of the fluid in the cylinder; and means to close said valve by moving said port into its non-registering position to arrest the flow of fluid in the cylinder to thereby cause the fluid to arrest the reciprocating movement of the frame and the rotation of the cam, said by-pass groove extending around the periphery of the valve to permit a slight flow of fluid after the valve is closed to cushion the stopping of said cam.

3. In a brake device, the combination of a reciprocating frame including two end members; two pistons, one mounted on each end member, extending inwardly toward each other; a single cylinder between the end members, into which the two pistons extend; a valve in the cylinder located between the free ends of the two pistons; a port in the valve having an open position and a closed position, said port registering with the inner walls of the cylinder when the valve is in open position and said port in non-registering position with the inner walls of the cylinder when the valve is in closed position; a by-pass groove in the periphery of said valve; fluid completely filling the cylinder and said port; a rotatable shaft; a cam on the rotatable shaft; means in the frame coacting with said cam whereby the cam reciprocates the frame and the pistons when the shaft is rotated and the port in the valve registers with the inner walls of the cylinder to permit free flow of the fluid in the cylinder; and two means to move the valve from said open position into a closed position, one of said means arranged to move the valve into a closed position wherein the by-pass groove permits a slight flow of fluid in the cylinder after the valve is closed to thereby cushion the stopping action of said cam, and the other means arranged to move the valve into a closed position wherein the by-pass groove does not prevent the flow of fluid in the cylinder, thereby locking the frame, the cam, and the shaft against movement.

4. In a brake device, the combination of a reciprocating frame including two end members; two pistons, one mounted on each end member, extending inwardly toward each other; a single cylinder between the end members, into which the two pistons extend; a valve in the cylinder located between the free ends of the two pistons; a port in the valve having an open position and a closed position, said port registering with the inner walls of the cylinder when the valve is in open position and said port in non-registering position with the inner walls of the cylinder when the valve is in closed position; a by-pass groove in the periphery of said valve; fluid completely filling the cylinder and said port; a rotatable shaft; a cam on the rotatable shaft; means in the frame coacting with said cam whereby the cam reciprocates the frame and the pistons when the shaft is rotated and the port in the valve registers with the inner walls of the cylinder to permit free flow of the fluid in the cylinder; two means to move the valve from said open position into a closed position, one of said means arranged to move the valve into a closed position wherein the by-pass groove permits a slight flow of fluid in the cylinder after the valve is closed to thereby cushion the stopping action of said cam, and the other means arranged to move the valve into a closed position wherein the by-pass groove does not prevent the flow of fluid in the cylinder, thereby locking the frame, the cam, and the shaft against movement; and an expansible means on the free end of each piston adapted, when the pressure of fluid in the cylinder is raised by closing the valve, to prevent flow of fluid past the piston.

5. In a brake device, the combination of a reciprocating frame including two end members; two pistons, one mounted on each end member, extending inwardly toward each other; a single cylinder between the end members, into which the two pistons extend; a valve in the cylinder located between the free ends of the two pistons; a port in the valve having an open position and a closed position, said port registering with the inner walls of the cylinder when the valve is in open position and said port in non-registering position with the inner walls of the cylinder when the valve is in closed position; a by-pass groove in the periphery of said valve; fluid completely filling the cylinder and said port; a rotatable shaft; a cam on the rotatable shaft; means in the frame coacting with said cam whereby the cam reciprocates the frame and the pistons when the shaft is rotated and the port in the valve registers with the inner walls of the cylinder to permit free flow of the fluid in the cylinder; two means to move the valve from said open position into a closed position, one of said means arranged to move the valve into a closed position wherein the by-pass groove permits a slight flow of fluid in the cylinder after the valve is closed to thereby cushion the stopping action of said cam, and the other means arranged to move the valve into a closed position wherein the by-pass groove does not prevent the flow of fluid in the cylinder, thereby locking the frame, the cam, and the shaft against movement; and a sealing disk on each piston to prevent flow of fluid past the pistons when the pressure of the fluid in the cylinder is raised by closing the valve.

DAVID G. PERRY.

REFERENCES CITED

The following references are of record in the file of this patent:

UNITED STATES PATENTS

| Number | Name | Date |
|---|---|---|
| 100,449 | Roberts | Mar. 1, 1870 |
| 171,218 | Emery | Dec. 21, 1875 |
| 614,899 | Sears | Nov. 29, 1898 |
| 1,297,600 | Shepard | Mar. 18, 1919 |
| 1,435,499 | Ricker | Nov. 14, 1922 |
| 1,485,304 | Shoemaker | Feb. 26, 1924 |
| 1,548,991 | Gionannini | Aug. 11, 1925 |
| 1,630,711 | McCleary | May 31, 1927 |
| 2,127,755 | Rosenberg | Aug. 23, 1938 |

FOREIGN PATENTS

| Number | Country | Date |
|---|---|---|
| 353,959 | Italy | Nov. 5, 1937 |